Patented Apr. 22, 1941

2,239,126

UNITED STATES PATENT OFFICE 2,239,126

METHOD OF DAMPPROOFING OF MASONRY STRUCTURES AND A LIQUID COATING COMPOSITION THEREFOR

Waitstill H. Swenarton, Montclair, N. J.

No Drawing. Application March 29, 1939,
Serial No. 264,736

5 Claims. (Cl. 134—39)

This invention relates to the dampproofing of damp or wet surfaces, more especially the inside surfaces of masonry walls or floors, where water is seeping therethrough from an external source.

Among the objects of the invention are the provision of a novel method of dampproofing damp or wet foundation walls through the direct application to the inside surfaces thereof, while water is seeping therethrough, of a coating or sealing compound.

Other objects of the invention reside in the provision of a paint, varnish, enamel or crack filler of the "oil" or nonemulsion type which is substantially anhydrous, substantially free from free lime and other caustic alkalies and which contains a relatively larger percentage of a highly colloidal clay, of the general order of bentonite, such coating or crack filler being capable of firmly adhering to and effectively sealing damp and even dripping wet surfaces of walls or floors to which it is directly applied and also serving as a compatible priming coat for finishing coats of ordinary paint, enamels, etc.

I am well aware, as set forth in Patent No. 1,277,425, it has been proposed to incorporate in an oil paint certain specified amounts of plaster of Paris and ped plaster (the latter being a mixture comprising two-thirds of plaster of Paris and one-third lime) and which paint is intended for use upon damp plaster walls or on the hulls of boats and other surfaces to which it is stated that the same will adhere and upon which the same will dry very quickly, the same being particularly intended for a first coat for damp surfaces. However, the very property of quick drying that is claimed for this product, renders same undesirable for permanently waterproofing the surfaces of masonry walls due to the fact that any quick drying paint tends to form a hard brittle film on aging in which there is a tendency for fine, water-permeable, hair-like cracks or fissures to develop due to the expansion and contraction of the wall surfaces under the varying temperature conditions to which they are subjected at different seasons of the year. Furthermore, the free lime in the ped plaster element of the composition is for many purposes highly objectionable especially if it is desired to employ a finish color coat of ordinary paint over the primer. Moreover, the reaction product of plaster of Paris with water is crystalline hydrated calcium sulphate, which is a chemical compound of calcium sulphate with two molecules of water of crystallization and consequently a paint product containing substantial quantities thereof possesses essentially different properties from my improved paint product hereinafter described wherein the highly colloidal bentonite or like water-absorbing component is of extremely minute particle size, the particles thereof being distinctly cellular in structure and noncrystalline and the water adsorbed thereby is not chemically combined therewith but freely evaporates therefrom on exposure to dry air.

My investigations have led to the discovery that a paint or varnish capable of forming waterproof films on drying and wherein the vehicle consists essentially of water-immiscible hydrocarbon and like solvents, mineral oils or vegetable drying oils and non-drying oils and other essentially non-aqueous water repellant liquids, can be rendered peculiarly suitable for application to wet or damp inside surfaces of masonry walls or floors while the moisture is actually seeping therethrough from an outside source by the incorporation therein of relatively large percentages of a clay-like substance of the order of bentonite, in powder form, all without objectionably impairing the desirable slow-drying properties of such paint products or the capability thereof on drying to form a waterproof film which is inert towards and compatible with a finish coat of typical oil paints of any desired color. Moreover, the resultant film is permanently non-brittle and essentially free from crystalline ingredients and accordingly is an effective, permanent dampproofing or sealing medium for the surfaces to which it is applied.

The following constitutes examples of paints, enamels and plastic crack sealing products embodying my invention, it being understood that the same are merely illustrative and that the scope of my invention is not to be understood as being limited thereto.

*Linseed oil paint*

| Pigment | 68 parts | Vehicle | 34 parts |
|---|---|---|---|
| Pigment: | Per cent | Vehicle: | Per cent |
| White lead | 48 | Bleached linseed oil | 80 |
| Zinc oxide | 24 | Turpentine | 8 |
| Titanium pigment | 10 | Japan dryer | 12 |
| Bentonite (200 mesh) | 18 | | |
| Total | 100 | Total | 100 |

In those cases where a plastic filler for sealing cracks in damp or wet masonry is desired, the bentonite in the aforesaid products can be advantageously increased to some 35% by weight of the total mixture instead of approximately 12% to 13% as given in the above example of a linseed oil paint, this being accomplished by adding 35 parts by weight of bentonite to each 100 parts by weight of the aforesaid linseed oil paint.

Enamel paint

| Pigment | 33 parts | Vehicle | 67 parts |
|---|---|---|---|
| Pigment: | Per cent | Vehicle: | Per cent |
| White lead | ⎫ | Drying oil | 30 |
| Zinc oxide | ⎬ 55 | Resins | 17 |
| Lithopone | ⎭ | Wood turpentine | 3.3 |
| Asbestine | 9 | Drier and heavy naphtha or like spirits thinner | 49.7 |
| Bentonite (200 mesh) | 36 | | |
| Total | 100 | Total | 100 |

The vehicle component of the above enamel paint, as such, constitutes an example of a typical varnish embodying my invention.

Black asphaltum paint

| | Per cent |
|---|---|
| Asphalt | 35 |
| Rosin | 8 |
| Stearin pitch | 12 |
| Castor oil | 6 |
| Solvent and thinner | 25 |
| Bentonite | 14 |
| Total | 100 |

The bentonite is preferably the last ingredient incorporated in the aforesaid paints, the same being added after the other ingredients have been admixed together in the manner customary in the art. In adding the bentonite, which should preferably be of about 350 mesh fineness, though the degree of fineness is not critical insofar as the action of the bentonite is concerned, is desirably spread upon the surface of the mixture of the other ingredients and permitted to settle by gravity beneath the surface whereupon, if allowed to stand for several hours, it gradually disperses throughout the mixture without necessitating any considerable amount of stirring or agitation to effect the intimate admixture of the bentonite with such other ingredients of the mixture.

Other drying oil paints, asphalt paints, coal tar paints, varnishes and enamel, the vehicles of which are immiscible with water and which are capable, on drying and ageing, when spread on a surface of producing a waterproof film, may also be employed for the production of my improved dampproofing paint by incorporating bentonite in the desired proportions therewith. The amount of bentonite employed should in no case be less than 2%, nor less than the amount required to render the paint, varnish or enamel product with which it is incorporated capable of being spread in an even film upon a damp surface and capable of firmly adhering thereto, notwithstanding the fact that the vehicle of the paint, varnish or enamel is, as above stated, by itself, water immiscible and therefore prevents the even spreading of the paint, when no bentonite is incorporated therein, upon a damp surface and thus prevents adherence of the paint film, free from bentonite, to any such damp surface to which it is applied. Preferably, I employ considerably in excess of 2% of bentonite, namely from 10% to 20% of bentonite in a product to be applied as a thin coating to a damp surface and from 20% to 50% of bentonite in products such as I term plastic crack sealers which are intended for troweling into cracks or fissures in a wall or floor. Preferably also the amount of the waterproof film-forming components of the paint, varnish or enamel product with which the bentonite is admixed should be sufficient to coalesce with the bentonite content of the mixture after the water adsorbed by the same has evaporated on exposure to the air and to form therewith when so coalesced, a waterproof, non-brittle film which is unaffected by humid air or water when in contact therewith.

Bentonite, the product referred to herein, is recognized generally as being a highly colloidal natural clay consisting essentially of the mineral known as Montmorillonite whose composition corresponds essentially to a hydrated aluminum, magnesium, calcium silicate, the principal occurrences of bentonite being in Wyoming, adjacent sections of Montana and the Dakotas and in the prairie regions of Western Canada. When dry, bentonite exists in the form of a powder of unusually small particle size, the particles being of a highly cellular structure and about 70% thereof being less than about one-half microns in diameter. Furthermore, bentonite has a remarkable water adsorption and dye adsorption indices, for example if one part of bentonite is admixed with 6 to 7 parts of water it forms a smooth flowing soap-like gel, the bentonite swelling to twelve to fifteen times its original bulk, but if allowed to dry in the open air, the water will evaporate therefrom and the bentonite will be converted to a dry solid, the particles of which are of cellular structure and the water content of the mass will be approximately six percent or even less. The dye adsorption figure of bentonite (see in this connection the paper "Dye Adsorption Test" in the Transactions of the American Foundryman's Association of May 1923) approximates a minimum of 25,000, whereas the maximum dye adsorption figure of the best grades of common clay is but about 12,000.

Due to its aforesaid highly cellular structure of powdered bentonite, linseed and other drying oils and film-forming magmas of the vehicles of enamels, varnishes and paints admixed therewith will deeply penetrate into the cells and coat the cell walls but without deleteriously impairing the property of the bentonite to unite with water when the paint, varnish or enamel is applied, by brushing preferably, as a thin film or coating to a damp or wet masonry surface.

Drying oil paints, varnishes and enamels having bentonite incorporated therein as aforesaid to render the coating adherent to damp or wet walls, are especially adapted for the sealing of foundation walls to prevent the penetration of moisture therethrough by the direct application of such products to the inside surfaces of said walls. Waterproof oil paints of well known composition such as are now available on the market, can be applied as a second coat to the surfaces of walls so treated and thereby the same are remarkably water-resistant and except where the conditions are most severe such walls, even though so coated on the inside surfaces thereof, while such surfaces are damp and even wet, will become actually waterproof.

Due to the affinity for damp surfaces of waterproof, substantially water-free bituminous paints, embodying my invention, they are especially adapted either for application to damp exterior foundation walls instead of employing, as is now the common practice, water and asphalt emulsions. Due to the absence of any water in the paint so applied and to its waterproofing characteristics, a far more durable, tougher and more waterproof coating is obtainable than where emulsions of asphalt are employed.

It is essential that the bentonite be present in an amount well in excess of that required to absorb and gelatinize with any incidental water, say the 3% or so which is sometimes present in the vehicle of drying-oil paints, and the amount of such bentonite should be sufficient so that it is dispersed in an unaltered or ungelatinized state completely throughout the vehicle of the paint, varnish or enamel and sufficient also to insure that upon the application of such paint, varnish or enamel to a damp or wet surface there will be sufficient unaltered bentonite in the immediate vicinity of the moisture on the underlying surface to adsorb the same forming a gel, and not only prevent the oily vehicle from being repelled by the wet surface to which it is applied but actually to facilitate the smooth and even application of an adherent film of the paint, varnish or enamel to such surface.

I am also well aware that bentonite has been employed in the manufacture of asphalt emulsions or so-called aqueous dispersions of asphalt, it being customary in such manufacture to prepare a thick gel of bentonite and water into which, while hot, the molten asphalt is poured in a thin stream. In such dispersions the amount of bentonite is but about ⅛ to ⅟₁₅ that of the water employed and but about 2% to 3%, by weight, of that of the resultant asphalt emulsion. Accordingly, I make no claim to such aqueous dispersions of asphalt wherein the bentonite is incorporated with the asphalt while in a gelatinous state, as distinguished from the dry powdered bentonite which it is essential to employ in the preparation of my improved dampproofing compositions as herein described.

The aforesaid crack sealer compound is preferably of a putty or dough-like consistency and this when trowelled into a large fissure or hole say of ½" in width, in a Portland cement foundation wall, through which water is flowing, under a head pressure of say 6 to 10 ft., such as commonly met with in the cellars of houses, will intimately adhere to the interior surfaces of such fissures or holes. Then, provided sufficient sealer is employed to fill the fissure or hole, such crack sealer will expand, owing to the unusual tendency of the bentonite ingredient thereof to swell to 10 to 15 times its original dry bulk, and thereupon the crack sealer will exert more than sufficient pressure to effectively interlock the same to the walls of the fissure or hole and thus effectively resist the further penetration of water from such outside source therethrough, notwithstanding the aforesaid head pressure on the outside of said wall or floor. Thereupon the external water source will be compelled to seek another drainage outlet and since the ground around the foundation is more penetrable than the sealed foundation wall, the water will eventually find another outlet thus eventually relieving the original pressure upon said walls. Similarly, in the case of a porous masonry wall or floor where there are no large holes or cracks but water is slowing seeping through the pores thereof from an outside source, the application or a coat of the aforesaid bentonite-containing paint or coating and particularly if reinforced by a substantially thick finish coat of waterproof enamel paint, free from bentonite, will effectively interlock with the porous wall structure and seal the same against the further penetration of water therethrough even against a head pressure from the external water source of 6 to 10 ft. Furthermore, once the wall is so sealed, the water from such external source will, as above explained, follow the line of least resistance and seek another outlet thereby relieving the inside surface of the wall from the original hydrostatic pressure previously exerted thereon while the water was flowing through the wall. After the water has been drawn away from the wall as a result of finding another drainage outlet externally thereof the wall will dry out and the pores thereof will become filled with air so that there is little likelihood of water from an external source ever again being able to percolate through the pores of the wall and contact with the rear surface of the dampproof coating so applied, due to intermediate air cushions being formed between the pistons or slugs of such percolating water and such rear surface of said coating. Accordingly if the inside surfaces of a wall which formerly had been habitually damp, due to penetration of water therethrough from an external source, is treated with the herein described dampproof coating and some months thereafter when the external conditions correspond to those that would have produced seepage through the untreated wall, a chip of an inch or so in thickness is removed from the wall, then instead of the cement in the chip being mushy or easily crushed due to the continual presence of drainage water therein, such chips will be found to be bone dry.

In those cases where castor oil is incorporated into the vehicle it is desirable to employ either castor oil derivatives known as butyl, methyl, ethyl or actyl ricinoleates or other so-called alkyl ricinoleates which are especially adapted to impart flexibility to the resultant film or again the well known so-called "synthetic" drying castor oil, produced by dehydration of the natural oil, may be employed in conjunction with from about ⅟₁₀% to ½% of well known castor oil dryers, such as cobalt, lead or manganese naphthenates or mixtures thereof, such dryers being employed to reduce or if desired to completely eliminate tackiness in the resultant film.

The term "pitch" as employed in this specification is intended to refer to and include natural bitumens and residuums obtained from the distillation of tars and oils and mixtures thereof.

While bentonite when dispersed in water shows a slight alkaline reaction, it does not deleteriously affect oil paints and varnishes when incorporated therein in the manner herein described even when such paints or varnishes are employed as coatings on damp or wet masonry walls.

Various modifications, within the scope of the appended claims may be made in the composition of my improved dampproofing products and in the method of preparing the same without departing from the spirit of my invention as embraced within the scope of the appended claims.

Having thus described my invention, what I claim and desire to obtain by United States Letters Patent is:

1. The method of waterproofing which comprises applying to an inside surface of masonry construction while water is penetrating through such surface, a coating of a member of a group consisting of a waterproof paint, varnish and enamel having a liquid vehicle containing a member of a group consisting of a drying oil and a bituminous compound and which contains dry, powdered bentonite in suspension therein, and which vehicle, if isolated from said bentonite, is water immiscible, slow drying and water-repellant, said bentonite being present in an amount exceeding 2% by weight of the coating and sufficient to permit of the application of such coating to the wet surface as an even film and to cause the firm adherence of such film to such damp surface and then permitting the coating to dry.

2. The method of sealing the inside surface of a masonry wall against seepage of water therethrough which comprises evenly spreading on such inside surface, while the same is damp, an essentially non-aqueous coating selected from the class of paints, varnishes and enamels and which contains a liquid vehicle having not less than 2% by weight of dry powdered bentonite of the order of bentonite suspended therein, which vehicle, by itself, is water immiscible, slow drying and water-repellant and is capable of drying to a waterproof film when applied as a thin coating on a dry masonry surface and which bentonite is present in an amount sufficient to cause said coating to firmly adhere to and be susceptible of being evenly spread on a water dampened surface.

3. In the method of waterproofing a masonry structure, the step which comprises applying to an inside surface thereof, while the same is wet from water seeping through such surface from the interior of such structure, a protective film of a waterproof composition selected from the class consisting of paints, varnishes and enamels and having a liquid vehicle containing a volatile thinner and a waterproof-film forming compound selected from the class of drying oils and which vehicle contains dry, powdered bentonite in suspension therein, such vehicle if isolated from said bentonite being water immiscible, slow drying and water-repellant and said bentonite being present in an amount in excess of 2% by weight of waterproof composition and sufficient to impart to said waterproof composition the property of drying to a firmly adherent sealing film upon such surface.

4. A liquid coating composition for dampproofing a masonry structure selected from the class consisting of paints, varnishes and enamels comprising an admixture of vehicle and pigment components, said vehicle component, if isolated, being water immiscible, slow-drying and capable of forming a waterproof film on drying and ageing and said vehicle including volatile liquid thinner and drying oil, the latter constituting the major non-volatile liquid constituent of such vehicle and said pigment component including not less than 5% nor more than about 20%, by weight, of the composition of dry powdered bentonite so as to cause said coating to firmly adhere to and be susceptible of being evenly spread upon a water-dampened inside surface to a masonry structure to which said vehicle, if isolated and spread thereon, would be non-adherent.

5. A liquid coating composition for dampproofing a masonry structure as claimed in claim 4, wherein the bentonite is present in an amount of about 12% to 13%, by weight, of the composition.

WAITSTILL H. SWENARTON.